(12) United States Patent
Lopez Pamplona et al.

(10) Patent No.: US 8,447,462 B2
(45) Date of Patent: May 21, 2013

(54) DIAGNOSIS MANAGEMENT SYSTEM AND DIAGNOSIS MANAGEMENT METHOD FOR A VALVE-CONTROLLED HYDROSTATIC DISPLACEMENT UNIT

(75) Inventors: Alejandro Lopez Pamplona, Horb (DE); Bjoern Beuter, Hirrlingen (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 12/963,215

(22) Filed: Dec. 8, 2010

(65) Prior Publication Data

US 2011/0214420 A1    Sep. 8, 2011

(30) Foreign Application Priority Data

Dec. 15, 2009 (DE) .................. 10 2009 058 376

(51) Int. Cl.
*G01M 17/00* (2006.01)
(52) U.S. Cl.
USPC ........................................................ 701/31.6
(58) Field of Classification Search
None
See application file for complete search history.

*Primary Examiner* — Thomas Tarcza
*Assistant Examiner* — Adam Alharbi
(74) *Attorney, Agent, or Firm* — Maginot, Moore & Beck

(57) ABSTRACT

A diagnosis management system for a hydrostatic displacement unit, including a control unit for controlling a drive motor, a hybrid control unit for controlling the motor control unit on the basis of at least one desired acceleration signal and one desired deceleration signal for the drive motor, a gear control unit for controlling the motor control unit on the basis of at least signals derived from a continuously variable gear, and a control unit for a digital displacement unit, for controlling at least one pump motor as the digital displacement unit is disclosed. The control unit for a digital displacement unit has at least one diagnostic interface, which detects operating values and/or operating states in order to detect system errors in the pump motor, a sensor unit portion associated with the pump motor, and/or a power electronics portion associated with the pump motor; and at least one calculation portion, which preprocesses the operating values and/or operating states detected by the diagnostic interface. The at least one diagnostic interface and the at least one calculation portion are disposed for operating in a first system direction for diagnosis and for determining a correction of incident system errors, and in a second system direction for diagnosis and/or for performing the correction of incident system errors. A diagnosis management method can be performed by the diagnosis management system.

20 Claims, 2 Drawing Sheets

DIAGNOSIS MANAGEMENT SYSTEM AND DIAGNOSIS MANAGEMENT METHOD FOR A VALVE-CONTROLLED HYDROSTATIC DISPLACEMENT UNIT

CROSS-REFERENCE TO RELATED APPLICATION

This application is based on German Patent Application 10 2009 058 376.9 filed on Dec. 15, 2009.

BACKGROUND OF THE INVENTION

1. Field of the Invention

The invention relates to a diagnosis management system for a valve-controlled hydrostatic displacement unit and to a diagnosis management method performed with such a diagnosis management system.

2. Description of the Prior Art

Hydrostatic drives, comprising a hydropump which drives a hydromotor via a fluid line, have in the meantime gained wide use in mechanical and systems engineering but also in the automotive field. Among the hydraulic or hydrostatic displacement machines or hydromachines used in this field as drives are pumps and motors, which operate on the displacement principle and as a rule have the same structural layout. By suitable control of the fluid flow, pumps in particular can function as motors, and vice versa. Because of the distinction in the direction of action, it is true of so-called hydropumps that they convert mechanical power into hydraulic power, and for so-called hydromotors that they convert hydraulic power back into mechanical power.

Recent drives, which are suitable particularly for vehicles, are digital displacement machines, which operate on the principle of digital displacement and are predominantly embodied as multi-cylinder pumps and/or multi-cylinder motors or multi-cylinder pump motors, for instance as radial piston engines. In such engines, each cylinder has at least two valves, such as cup valves, slide valves, combination valves, and the like, of which one is a low-pressure valve communicating with a low-pressure fluid, and the other is a high-pressure valve communicating with a high-pressure fluid, and a microcontroller reads out a piston position or shaft position sensor and controls one or more of the valves. A hydraulic motor is attained when the high-pressure valve is triggered as well.

While the aforementioned type of drives has considerable advantages, particularly in the automotive field, or in other words for motor vehicles, in that case for instance as a gear-axle drive unit, such as a fast response speed and inherent energy efficiency from high efficiency, nevertheless it lacks diagnostic capabilities and evaluation logic units for errors in the control part, especially of the hydrostatic valve-controlled displacement unit or digital displacement unit, and more precisely for errors in the power electronics employed there. This is because until now, in a triggering chain, an FPGA (Field Programmable Gate Array) has been used as an array of logic gates that can be configured in the field of application and that operates on the order of a port expander. Here, the FPGA receives bus signals only from a controlling microcontroller, transfers them within a predeterminable length of time to corresponding end stages, and thus triggers those end stages. Thus signals are forwarded in only one direction to the digital displacement unit to be controlled, and no diagnosis or feedback signals are provided. Because of the lack of feedback between the components, sources of error can be located only with difficulty. The FPGA itself is furthermore vulnerable to malfunction and difficult to analyze. Finally, the use of FPGAs in the automotive field might not be permissible in every case.

Accordingly, the known triggering chain for a digital displacement unit, which is based on the use of an FPGA, has no diagnostic capabilities, so that errors cannot be detected, no information exchange between the components of the triggering chain can take place, and thus in the system no reactions to any errors in the system can take place. Hence there is a problem, in that a higher-order control and/or regulating system in the event of error will receive no information about the type and severity of the error in the digital displacement unit. The result can be damage in components, lines, and the like—those that carry pressure, for instance. Until now, errors in the system could be detected only by experience with the system in operation, so that expensive system maintenance was furthermore disadvantageously absolutely necessary.

OBJECT AND SUMMARY OF THE INVENTION

It is therefore the object of the invention to create a diagnosis management system and a diagnosis management method for a valve-controlled hydrostatic displacement unit by which an improved electronic triggering unit is attained, and diagnosis and based on that a change in the triggering of the valve-controlled hydrostatic displacement unit can be done.

According to the invention, a functionality for error detection and for error handling, for detecting critical system states, for treating exceptions, and for a substitute strategy in the event of error are thus meant to be furnished.

One fundamental idea of the invention is to implement a diagnosis management system and a diagnosis administration or management as well as a plausibility check of system variables and sensor values, such as a temperature, a pressure, set-point and actual values for these, among others, and/or the direction of rotation, for a valve-controlled hydrostatic displacement unit or digital displacement unit or piston engine by reinforcing and furnishing diagnostic interfaces in hardware, in software, and in the form of models for sturdy operation under valid operating conditions. On the basis of well-founded outcomes of diagnosis, corrective intervention can then be done in the sequence control of the hydrostatic displacement unit, as a result of which the hydrostatic displacement unit is advantageously prevented from becoming unstable, and the sturdiness and intrinsic safety of the hydrostatic displacement unit and of the overall system can be improved.

For instance, by means of the diagnosis management system of the invention and the diagnosis management method of the invention, with a view to improved intrinsic safety in the event of error, depending on the degree of severity, for instance whether an error is critical for the overall system or not, a distinction can be made by means of a suitable plausibility check, and a decision can be made as to whether, by an intervention in the sequence control by outputting only a suitable report to a driver without forwarding the error situation to the higher-order system, the hydrostatic displacement unit can be stabilized and continue to be operated, or whether the error situation must be forwarded to the higher-order system and a decision made there about how to handle it. In both cases, appropriate substitute driving strategies can be employed, which takes suitable account of the severity of the error detected.

According to the invention, a diagnosis management system for a hydrostatic displacement unit, includes: a motor control unit for controlling a drive motor; a hybrid control unit for controlling the motor control unit on the basis of at least one desired acceleration signal and one desired delay signal for the drive motor; a gear control unit for controlling the motor control unit on the basis of at least signals derived from a continuously variable gear; and a control unit for a digital displacement unit, for controlling at least one pump motor as the digital displacement unit. The control unit for a digital displacement unit has at least one diagnostic interface, which detects operating values and/or operating states in order to detect system errors in the pump motor, a sensor unit portion associated with the pump motor, and/or a power electronics portion associated with the pump motor, and at least one calculation portion, which preprocesses the operating values and/or operating states detected by the diagnostic interface; and the at least one diagnostic interface and the at least one calculation portion are disposed for operating in a first system direction for diagnosis and for determining a correction of incident system errors, and in a second system direction for diagnosis and/or for performing the correction of incident system errors. A diagnosis management method can be performed by means of the diagnosis management system.

The individual control units can each be embodied as physical components, or, if a hardware basis is only partly needed or is not needed, they can be furnished in part or entirely as a software module or modules. Moreover, the pump motor can be a motor-pump motor and/or a drive pump motor, without limiting the invention.

Preferably, the at least one diagnostic interface contains a first diagnostic interface in the first system direction from the pump motor to the control unit for a digital displacement unit and a second diagnostic interface in the second system direction from the control unit for a digital displacement unit to the pump motor.

It is also preferred that via the at least one diagnostic interface, in the first system direction, information about operating states of the sensor unit portion, the power electronics portion, and/or the pump motor are forwarded to the control unit for a digital displacement unit, and in the second system direction, control commands generated in response to the information forwarded in the first system direction and reactions to detected system errors are forwarded by the control unit for a digital displacement unit to the sensor unit portion, the power electronics portion, and/or the pump.

Also preferably, the calculation portion, for preprocessing the detected operating values and/or operating states, performs at least one calculation from a model-based calculation with or without ascertaining tolerance ranges, a plausibility calculation to assess the plausibility of the detected operating values, a monitoring calculation, and/or an evaluation calculation, on the basis of the operating values detected.

Advantageously, the control unit for a digital displacement unit also can have an evaluation logic unit for performing the evaluation calculation.

In a preferred way, the system errors are an electrical error, a short circuit to a battery current supply, a short circuit to a system ground potential, a line interruption, a sensor error, an erroneous operating state, and/or a communications error between system units. Moreover, a system error can also comprise an excessive temperature of a system component.

Also preferably, the system commands generated in the second system direction by the higher-order system in response to the information forwarded in the first system direction, and reactions, accomplish a switchover of the control unit for a digital displacement unit to model-based values, predetermined values, a monitoring strategy, and/or an emergency driving strategy.

Moreover, the object of the invention is attained by a diagnosis management method for a hydrostatic displacement unit, which is disposed in a combination having a motor control unit for controlling a drive motor, a hybrid control unit for controlling the motor control unit on the basis of at least one desired acceleration signal and one desired deceleration signal for the drive motor, and a gear control unit for controlling the motor control unit on the basis of at least signals derived from a continuously variable gear, which method includes the following steps: controlling at least one pump motor by means of a control unit for a digital displacement unit; detecting operating values and/or operating states for detecting system errors, occurring in the pump motor and/or in a power electronics portion associated with it, by means of at least one diagnostic interface of the control unit for a digital displacement unit; preprocessing the detected operating values and/or operating states by means of at least one calculation portion in at least one first system direction for diagnosis and for determining a correction of incident system errors; and diagnosing and/or correcting incident system errors in a second system direction for performing the correction.

Thus the diagnosis management method advantageously manages the diagnosis mechanisms of the hydrostatic displacement unit, such as a continuously variable gear, separately and in a special way, and the motor control unit, for instance for an internal combustion engine such as a diesel engine, and the hybrid control units have their own diagnosis mechanisms. The diagnosis mechanisms of the hydrostatic displacement unit are thus in particular independent of such other control units in the overall system, and in the diagnosis management for the hydrostatic displacement unit, variables from other control units can also be used and taken into account.

One preferred step in the method is that the diagnosis is performed in the first system direction from the pump motor to the control unit for a digital displacement unit and/or in the second system direction from the control unit for a digital displacement unit to the pump motor.

Also preferably, in the first system direction, information about operating states of the sensor unit portion, the power electronics portion, and/or the pump motor are forwarded to the control unit for a digital displacement unit, and in the second system direction, control commands generated in response to the information forwarded in the first system direction and reactions to detected system errors are forwarded by the control unit for a digital displacement unit to the sensor unit portion, the power electronics portion, and/or the pump.

Also preferably, for preprocessing the detected operating values and/or operating states, at least one calculation from the model-based calculation with or without ascertaining tolerance ranges, a plausibility calculation for assessing the plausibility of the detected operating values, a monitoring calculation, and/or an evaluation calculation are performed on the basis of the detected operating values.

Advantageously, the performance of the evaluation calculation is effected by means of an evaluation logic unit.

Preferably, in the diagnosis management method, system errors are an electrical error, a short circuit to a battery current supply, a short circuit to a system ground potential, a line interruption, a sensor error, an erroneous operating state, and/or a communications error between system units. Moreover, a system error can also comprise an excessive temperature of a system component.

Finally, advantageously, system commands generated in the second system direction by the higher-order system in response to the information forwarded in the first system direction, and reactions, can accomplish a switchover of the control unit for a digital displacement unit to model-based values, predetermined values, a monitoring strategy, and/or an emergency driving strategy.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
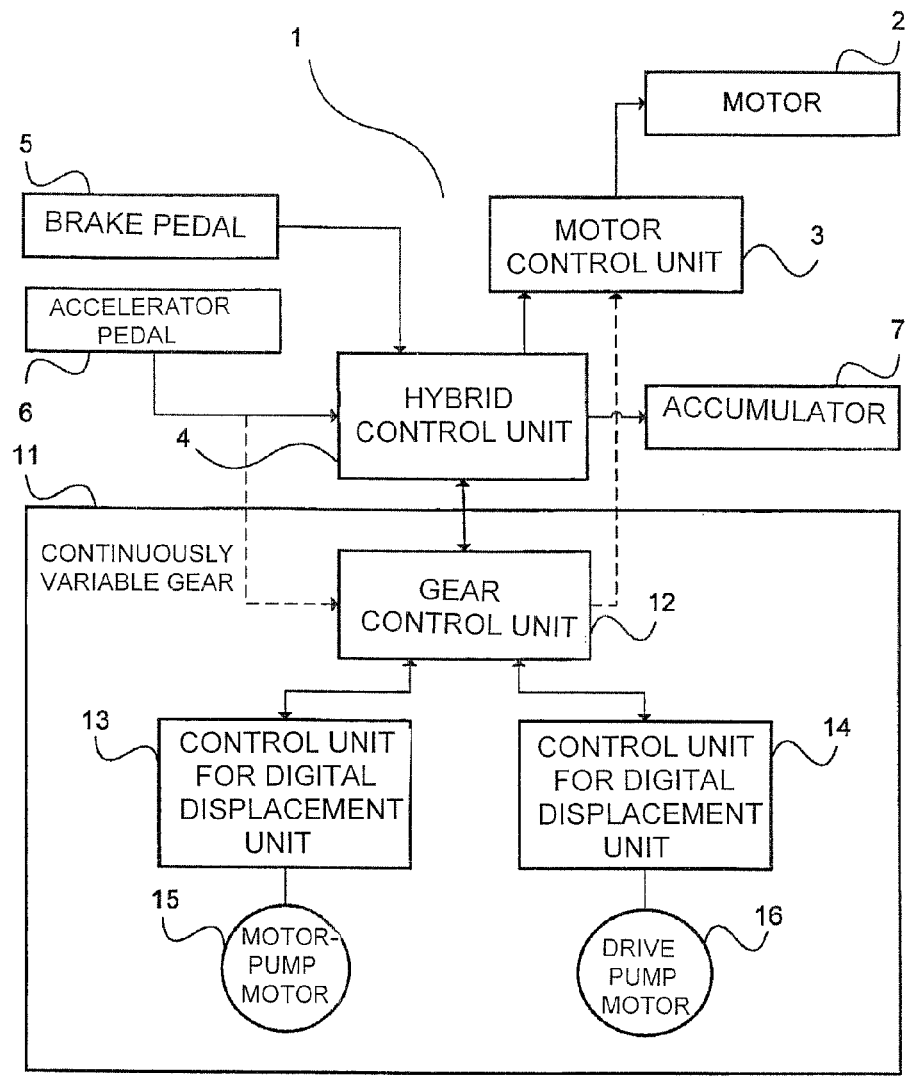
FIG. 1 is a block circuit diagram, as a system overview of a hydrostatic displacement unit.

FIG. 1, in a block circuit diagram, in highly simplified form, shows a system overview of a valve-controlled hydrostatic displacement unit, as part of a drive system 1 of a vehicle. However, the invention is in no way limited to vehicles, but instead can be employed in any instance of use of hydrostatic displacement units. In the illustration in FIG. 1, the drive system 1 includes a motor 2, for instance in the form of a known internal combustion engine, which is controlled via a motor control unit, also known as an ECU, or engine control unit 3. The motor control unit receives control signals from a hybrid control unit (HCU) 4 and optionally (as indicated by a dashed arrow line) from a gear control unit 12, also called TCU or transmission control unit, which is part of a continuously variable gear 11, also known as an IVT, or infinitely variable transmission, or CVT, continuously variable transmission.

The hydrostatic displacement unit receives driver requests in the form of control signals from a brake pedal 5 and an accelerator pedal or gas pedal 6 as a demand for deceleration or acceleration; it communicates with the gear control unit 12, and it is also connected to an accumulator 7, which depending on the type of hybrid control unit 4 can be provided in a suitable way as a hydraulic reservoir or hydroreservoir, or in other words as a pneumatic accumulator, and/or as an electrical accumulator.

The gear control unit 12 in the continuously variable gear 11 optionally (indicated by a dashed arrow line) also receives the accelerator pedal driver demand from the accelerator pedal 6 and communicates with the hybrid control unit 4 as well as with a control unit 13 for a digital displacement unit of an engine pump motor (EPM) 15 connected to it, having for instance 36 coils, and a control unit 14 for a digital displacement unit of a drive pump motor (DPM) 16 connected to it, having for instance 72 coils. It will be noted that the engine pump motor 15 and the drive pump motor 16 form the digital displacement units (also called DDUs, for digital displacement units), or a part thereof, and the control unit for these units is also called a DCU or DDU control unit, and the communication between the hybrid control unit 4, the gear control unit 12, and the control units 13, 14 for a digital displacement unit preferably takes place bidirectionally, without being limited to that.

The individual elements of the system shown as an overview in FIG. 1, as function blocks of a drive system for vehicles, are known per se, so that a detailed description of their fundamental function, layout and mode of operation will be omitted.

Figure 2:
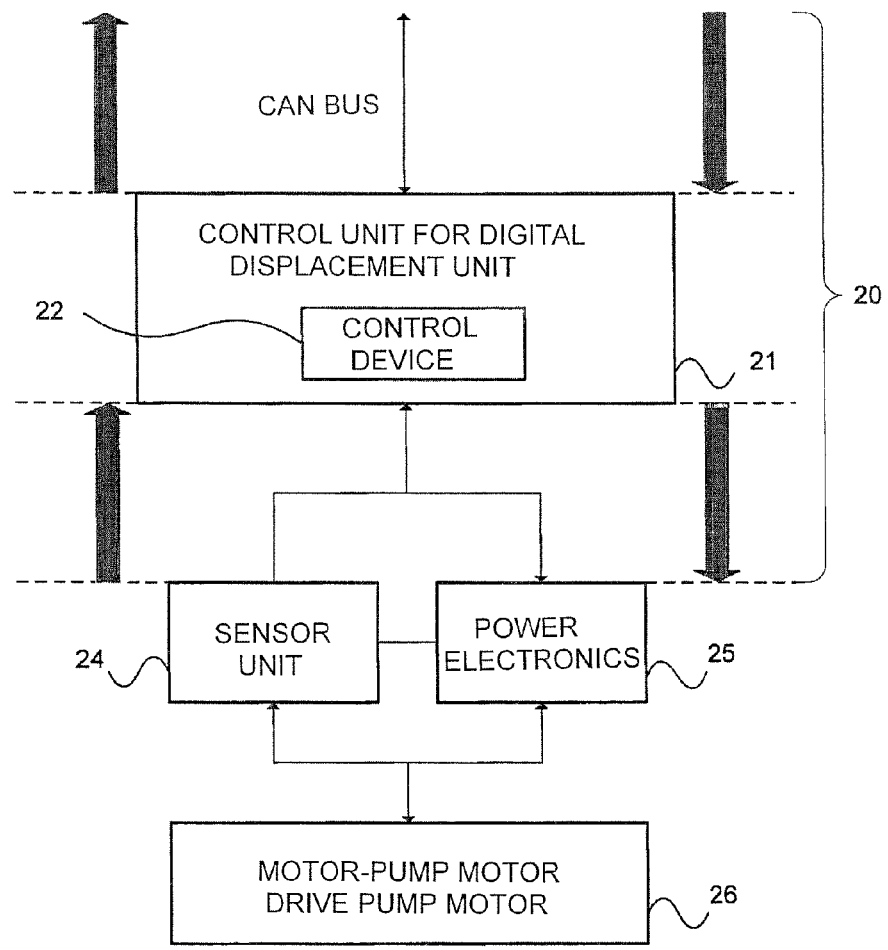
FIG. 2 is a more-detailed view of the triggering chain of the hydrostatic displacement unit of FIG. 1 in one exemplary embodiment.

FIG. 2 shows a more-detailed view of the triggering chain of the hydrostatic displacement unit of FIG. 1 in one exemplary embodiment. In FIG. 2, a control unit 21 for a digital displacement unit corresponds to the control units 13 and 14 for a digital displacement unit in FIG. 1, and an engine pump motor/drive pump motor 26 corresponds to the engine pump motor 15 or drive pump motor 16 in FIG. 1.

FIG. 2 also shows a higher-order system 20 compared to a sensor unit portion 24, a power electronics portion 25, and the pump motor 26, and this higher-order system contains the engine control unit 3, the hybrid control unit 4, and the gear control unit 12, all not shown here, as well as a control unit 21 for a digital displacement unit, as part of the gear control unit 12, with a control device or control unit 22 for specific triggering of the pump motor connected to it, and the like, the sensor unit portion 24, the power electronics portion 25, and the triggered engine or drive pump motor 26. It will be noted that the higher-order system 20, up to and including the gear control unit 12, can be provided in common for the entire system, and for each pump motor present, there can be at least one control unit 21 for a digital displacement unit, at least one sensor unit portion 24, and at least one power electronics portion 25.

However, the invention is not limited to this; instead, depending on the demands in a concrete instance of application, still other combinations of the aforementioned elements and blocks that meet the control purpose are possible. According to the invention, the term combinations is also understood to mean various embodiments that integrate the aforementioned elements and blocks. For instance, the gear control unit 12 and the control unit 21 for a digital displacement unit can be integrated in a single control unit or in other words form one and the same control unit, and/or the hybrid control unit 4 can additionally be provided integrated together with or jointly with the gear control unit 12 in the control unit 21 for a digital displacement unit. From such combinations and integrative embodiments, further options for optimizing the entire system are obtained, for instance in cases in which functionalities can be represented by means of software modules and/or software components and as a result can be combined or integrated expediently, simply, and/or economically.

With respect to a material connection of the elements, portions and blocks shown in FIGS. 1 and 2, in the present exemplary embodiment liquid-carrying segments communicate by means of pipelines or hollow lines and are connected to segments that process current and/or voltage as well as data signals by means of electrical conductor tracks. In particular, the higher-order system 20 itself communicates internally by means of suitable bus lines, for instance, and preferably a CAN data bus or some other bus system suitable for the purpose, and these also bring about the connection with the control unit for a digital displacement unit.

Between the control unit for a digital displacement unit and the downstream portions of the sensor unit 24 and of the power electronics 25 as well as the pump motor 26, various interfaces in particular are furnished by various intermediate connections as shown in FIG. 2. These include, to name only a few that are not shown per se and do no limit the invention to themselves, preferably the CAN (Controller Area Network) interface or some other bus system suitable for the purpose, a DIO (digital input/output) interface for data input and output, a PWM or pulse width modulation interface, an SPI (serial peripheral interface) for serially connectable external and peripheral devices, an MSC interface for a control device of a mass memory, and an ADC (analog/digital converter) interface with an analog/digital converter. In general, via these interfaces, any kinds of communication signals and/or control signals are carried, and these interfaces can also be bus interfaces, such as Flexray, EEPROM, and the like.

For implementing diagnosis administration or management for an error situation in the system, processes will be described below, which proceed as indicated by the heavy black arrows in FIG. 2.

A system error occurring in the sensor unit portion 24, the power electronics portion 25, or the pump motor 26 can for instance be an electrical error, such as a short circuit to a battery (not shown), a short circuit to a system ground potential, an interruption for instance of a line connection, resulting in an open load, a communication error at the serial-peripheral interface or SPI, an excessively high temperature of a component, and the like. Other system errors can originate in system sensors involved and in association with these in erroneous operating states, and the like.

For detecting such system errors, beginning at the level of the sensor unit portion 24 and the power electronics portion 25, as indicated by a horizontal dashed line in FIG. 2, sensor values detected in a first process from various systems installed in the system, and operating states detected—preferably actual operating states—initially as sensor values, data and signals, among other things, are forwarded to the control unit 21 for a digital displacement unit, following the heavy black arrow shown at the bottom left in the drawing.

The control unit 21 for a digital displacement unit, which has a microcomputer or microcontroller (not shown), takes over the system detection values, data and/or signals forwarded from the level of the sensor unit portion 24 and the power electronics 25 and then on the basis of them performs various calculations in a calculation portion (not shown) and evaluations in an evaluation portion (not shown), or an evaluation logic unit furnished for the purpose.

As such calculations, at least a model-based calculation and a plausibility check are performed. The model-based calculation serves, on the basis for instance of predetermined characteristic curves, tables, and/or other data, for instance empirical data, to ascertain specified values for the actual detected system detection values, data and/or signals to be taken into account, and to determine allowable tolerance ranges for the various specified values, within which ranges the system detection values, data, and/or signals are supposed to or have to be located in order to be capable of being distinguished as valid, or in other words error-free, or invalid, or in other words an error situation. The plausibility check can additionally be used in this connection to reinforce or invalidate the outcome of the model-based calculation, or can be used as a separate, further criterion. The plausibility calculation can serve for instance to ascertain quickly, and/or to make an estimate, whether a value to be checked can still be an appropriate value, in which case a more-complicated model-based calculation should be performed, or is already located so far from system values that the more-complicated model-based calculation can safely be dispensed with. As a result, a faster reaction time of the diagnosis management can be attained, or the available computation power can be distributed more suitably. Moreover, it can be provided that the control unit 21 for a digital displacement unit performs a monitoring operation, which responds for instance to a missing detection value, datum or signal, or detects from threshold values whether predetermined ranges and the like have been exceeded or undershot. Finally, the evaluation logic unit can also include suitable circuit arrangements and/or routines for a targeted conversion and/or preparation, such as filtration, amplification, or buffer storage, of the values, data and signals forwarded to the control unit 21 for a digital displacement unit, into correspondence values with improved further processing.

The outcomes (values, data and/or signals) of the provisions performed in the control unit 21 for a digital displacement unit are then, in a second process, via the CAN data bus, forwarded to various suitable control units of the higher-order system 20 or interpreted in suitable internal software abstraction layers, in order to derive provisions for controlling or regulating the power electronics portion 25 and thus also the pump motor 26. Alternatively, not only the outcomes of the calculations made in the control unit 21, but the starting or raw values or data for these calculations as well, can be forwarded to the higher-order system 20. In detail, at least status information, feedbacks about system and/or operating states, and detected sensor values, such as rpm values, pressure values, and temperature values, are transmitted as raw values and/or filtered, generally preprocessed values from the control unit 21 for a digital displacement unit to the higher-order system 20.

On this basis, the higher-order system 20, or one of the control units 3, 4, and 12 responsible for this that are shown in FIG. 1, converts the values obtained from the control unit 21 in a third process into control commands and reactions of the higher-order system to the feedbacks obtained from the control unit 21.

The conversion can among other ways preferably by the application of predetermined strategies or substitute reactions, for instance as a function of the degree of severity of an ascertained system error, a switchover to model-based values or predetermined values, or a switchover to an emergency driving strategy, can be done. The invention is not limited to a particular strategy; instead, it includes all strategies that lead to a system error diagnosis suitable for a particular application and associated with this to suitable system error handling. The higher-order system 20 then generates the output values, data and signals corresponding to the converted control commands and reactions and outputs them to the control unit 21 for a digital displacement unit.

According to the invention, as indicated by heavy black arrows at top left and top right in the drawing, a distinction is made between diagnostic functionalities of the control unit 21 for a digital displacement unit and diagnostic functionalities of the remaining higher-order system 20 overall, in view of, among other factors, its scope, range of validity, error category, encapsulation, and intelligence about the associated system. As a result, for the various diagnostic functionalities, different forms of reaction options can then be predetermined, as a function of definable (partial) system limits, or responsibility ranges determined thereby of the control unit 21 and of the system 20.

The control unit 21 for a digital displacement unit forwards the converted output values, data and signals, either calculated by the control unit itself and/or obtained in some other way from the remainder of the higher-order system 20, either to the next level of the sensor unit portion 24, the power electronics portion 25, and the pump motor 26, for takeover there and forwarding onward, or alternatively or optionally, it performs a model-based calculation, plausibility check, monitoring, and/or evaluation, now in the forward direction, for them in turn.

In the last case mentioned, as a result a diagnosis administration or management can be obtained not only in the backward direction, that is, from a control target to the control unit 21 for a digital displacement unit and/or the remainder of the higher-order system 20, but also in the forward direction, from the control unit 21 for a digital displacement unit and/or the remainder of the higher-order system 20 to the control target, and thus bidirectional checking can be done also for system errors in the higher-order system 20 before the take-over of these control commands and reactions and their execution by the pump motor 26.

If the control unit 21 for a digital displacement unit ascertains that the control commands and reactions obtained from the remainder of the higher-order system 20 correspond to a predetermined model, are plausible, and/or suffice in monitoring, or if it accepts them as valid without renewed calculation and checking, or if it itself within its defined range of responsibility has calculated control commands and reactions, the control unit 21 for a digital displacement unit converts these control commands and reactions into control commands, reactions to reported errors, and monitoring strategies suitable for the sensor unit portion 24 and the power electronics portion 25, and outputs correspondingly required control commands, values, data and/or signals for diagnosis-correcting control of the pump motor 26. In other words, within various system limits and responsibility ranges, a diagnosis-correcting control of the pump motor can be done by the control unit 21 for a digital displacement unit alone, by the remainder of the higher-order system 20, or by both in collaboration.

Thus according to the invention, both before and after the control unit 21 for a digital displacement unit, a diagnostic interface is implemented, in other words a first (input) diagnostic interface and second (output) diagnostic interface with respect to the control unit 21 for a digital displacement unit, which is traversed, in the reverse direction to the higher-order system 20 on the one hand and in the forward direction to the pump motor 26 to be controlled on the other, by variables, values, date and signals relevant to system errors and the detection of such errors. As a result, already in the control unit 21, it becomes possible for a digital displacement unit to diagnose and at least preprocess system errors that occur before and/or after that control unit.

By furnishing and embodying the control unit 21 for a digital displacement unit especially for a digital displacement unit and the parameters and models specific to such a digital displacement unit on the order of an encapsulation of the control unit and digital displacement unit, that is, as a partial system comprising dedicated software and hardware components of the displacement unit, in a vehicle combination for instance with a motor control unit and the coupling hybrid control unit as the remainder of the higher-order system, the diagnostic interface of the invention can advantageously be integrated without adaptation effort with the higher-order system 20 or with the downstream sensor unit portion 24 and power electronics portion 25 into the vehicle combination.

In a modification of the exemplary embodiment, for instance by the use of intelligent circuits in the power electronics portion 25, further improvements with regard to the diagnostic capabilities are attainable.

The exemplary embodiment described above offers in particular advantages in terms of more-detailed error recognition and of locating errors, which make a rapid intervention into the sequence control possible. The excellent result is an increase in the sturdiness of the system with a view to the protection of components and component units from overload and that valid operating points are made available and ensured. Moreover, substitute reactions are possible in a targeted way, depending on the type and severity of errors, on the basis of monitoring concepts, emergency driving strategies, and maintenance requirements.

Thus what has been described is a diagnosis management system for a hydrostatic displacement unit, containing: a control unit 3 for controlling a drive motor 2; a hybrid control unit 4 for controlling the motor control unit 3 on the basis of at least one desired acceleration signal and one desired deceleration signal for the drive motor 2; a gear control unit 12 for controlling the motor control unit 3 on the basis of at least signals derived from a continuously variable gear 11; and a control unit 13, 14 for a digital displacement unit, for controlling at least one pump motor 15, 16 as the digital displacement unit, in which the control unit 13, 14 for a digital displacement unit has at least one diagnostic interface, which detects operating values and/or operating states in order to detect system errors in the pump motor 15, 16, a sensor unit portion 24 associated with the pump motor, and/or a power electronics portion 25 associated with the pump motor; and at least one calculation portion, which preprocesses the operating values and/or operating states detected by the diagnostic interface; and the at least one diagnostic interface and the at least one calculation portion are disposed for operating in a first system direction for diagnosis and for determining a correction of incident system errors, and in a second system direction for diagnosis and/or for performing the correction of incident system errors.

The foregoing relates to a preferred exemplary embodiment of the invention, it being understood that other variants and embodiments thereof are possible within the spirit and scope of the invention, the latter being defined by the appended claims.

We claim:

1. A diagnosis management system for a hydrostatic displacement unit, characterized by:
   a control unit for controlling a drive motor;
   a hybrid control unit for controlling the motor control unit on a basis of at least one desired acceleration signal and one desired deceleration signal for the drive motor;
   a gear control unit for controlling the motor control unit on a basis of at least signals derived from a continuously variable gear; and
   a control unit for a digital displacement unit, for controlling at least one pump motor as the digital displacement unit,
   wherein the control unit for a digital displacement unit has at least one diagnostic interface, which detects operating values and/or operating states in order to detect system errors in the pump motor, a sensor unit portion associated with the pump motor, and/or a power electronics portion associated with the pump motor; and
   at least one calculation portion, which preprocesses the operating values and/or operating states detected by the diagnostic interface; and
   the at least one diagnostic interface and the at least one calculation portion are disposed for operating in a first system direction for diagnosis and for determining a correction of incident system errors, and in a second system direction for diagnosis and/or for performing the correction of incident system errors.

2. The diagnosis management system as defined by claim 1, wherein the at least one diagnostic interface includes a first diagnostic interface in the first system direction from the pump motor to a higher-order system and a second diagnostic interface in the second system direction from the higher-order system to the pump motor.

3. The diagnosis management system as defined by claim 1, wherein via the at least one diagnostic interface, in the first system direction, information about operating states of the sensor unit portion, the power electronics portion, and/or the pump motor are forwarded to a higher-order system, and in the second system direction, control commands generated in response to information forwarded in the first system direction and reactions to detected system errors are forwarded by the higher-order system to the sensor unit portion, the power electronics portion, and the pump motor.

4. The diagnosis management system as defined by claim 1, wherein the calculation portion, for preprocessing detected operating values and/or operating states, performs at least one calculation from a model-based calculation with or without ascertaining tolerance ranges, a plausibility calculation to assess plausibility of the detected operating values, a monitoring calculation, and/or an evaluation calculation, on a basis of the operating values detected.

5. The diagnosis management system as defined by claim 4, wherein the control unit for a digital displacement unit also has an evaluation logic unit for performing the evaluation calculation.

6. The diagnosis management system as defined by claim 1, wherein the system errors are an electrical error, a short circuit to a battery current supply, a short circuit to a system ground potential, a line interruption, a sensor error, an erroneous operating state, and/or a communications error between system units.

7. The diagnosis management system as defined by claim 3, wherein the system commands generated in the second system direction by the higher-order system in response to the information forwarded in the first system direction, and reactions, accomplish a switchover of the control unit for a digital displacement unit to model-based values, predetermined values, a monitoring strategy, and/or an emergency driving strategy.

8. The diagnosis management system as defined claim 1, wherein the hybrid control unit and/or the gear control unit is integrated with the control unit for a digital displacement unit.

9. The diagnosis management system as defined claim 2, wherein the hybrid control unit and/or the gear control unit is integrated with the control unit for a digital displacement unit.

10. The diagnosis management system as defined claim 3, wherein the hybrid control unit and/or the gear control unit is integrated with the control unit for a digital displacement unit.

11. The diagnosis management system as defined claim 4, wherein the hybrid control unit and/or the gear control unit is integrated with the control unit for a digital displacement unit.

12. The diagnosis management system as defined claim 5, wherein the hybrid control unit and/or the gear control unit is integrated with the control unit for a digital displacement unit.

13. The diagnosis management system as defined claim 7, wherein the hybrid control unit and/or the gear control unit is integrated with the control unit for a digital displacement unit.

14. A diagnosis management method for a hydrostatic displacement unit, which is disposed in a combination having a motor control unit for controlling a drive motor, a hybrid control unit for controlling the motor control unit on a basis of at least one desired acceleration signal and one desired deceleration signal for the drive motor, and a gear control unit for controlling the motor control unit on a basis of at least signals derived from a continuously variable gear, the method having the following steps:

controlling at least one pump motor by means of a control unit for a digital displacement unit;
detecting operating values and/or operating states for detecting system errors, occurring in the pump motor and/or in a power electronics portion associated with the pump motor, by means of at least one diagnostic interface of the control unit for a digital displacement unit;
preprocessing detected operating values and/or operating states by means of at least one calculation portion in at least one first system direction for diagnosis and for determining a correction of incident system errors; and
diagnosing and/or correcting incident system errors in a second system direction for performing the correction.

15. The diagnosis management method as defined by claim 14, wherein the diagnosis is performed in the first system direction from the pump motor to the control unit for a digital displacement unit and/or in the second system direction from the control unit for a digital displacement unit to the pump motor.

16. The diagnosis management method as defined by claim 14, wherein in the first system direction, information about operating states of the sensor unit portion, the power electronics portion, and/or the pump motor are forwarded to the control unit for a digital displacement unit, and in the second system direction, control commands generated in response to information forwarded in the first system direction and reactions to detected system errors are forwarded by the control unit for a digital displacement unit to the sensor unit portion, the power electronics portion, and/or the pump.

17. The diagnosis management method as defined by claim 14, wherein for preprocessing detected operating values and/or operating states, at least one calculation from a model-based calculation with or without ascertaining tolerance ranges, a plausibility calculation for assessing the plausibility of the detected operating values, a monitoring calculation, and/or an evaluation calculation are performed on a basis of the detected operating values.

18. The diagnosis management method as defined by claim 17, wherein the performance of the evaluation calculation is effected by means of an evaluation logic unit.

19. The diagnosis management method as defined by claim 14, wherein system errors are an electrical error, a short circuit to a battery current supply, a short circuit to a system ground potential, a line interruption, a sensor error, an erroneous operating state, and/or a communications error between system units.

20. The diagnosis management method as defined by claim 17, wherein system commands generated in the second system direction by a higher-order system in response to information forwarded in the first system direction, and reactions, accomplish a switchover of the control unit for a digital displacement unit to model-based values, predetermined values, a monitoring strategy, and/or an emergency driving strategy.

\* \* \* \* \*